United States Patent
Joseph et al.

(10) Patent No.: US 7,204,418 B2
(45) Date of Patent: Apr. 17, 2007

(54) PULSED ILLUMINATION IN IMAGING READER

(75) Inventors: Eugene Joseph, Coram, NY (US); Bradley Carlson, Huntington, NY (US); Duanfeng He, South Setauket, NY (US); Christopher Brock, Manorville, NY (US); Edward Barkan, Miller Place, NY (US); Warren Zuelch, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/007,403

(22) Filed: Dec. 8, 2004

(65) Prior Publication Data

US 2006/0118627 A1 Jun. 8, 2006

(51) Int. Cl.
*G06K 7/10* (2006.01)
(52) U.S. Cl. .................................. 235/454
(58) Field of Classification Search ............ 235/454
See application file for complete search history.

(56) References Cited

U.S. PATENT DOCUMENTS

| 3,716,752 | A | * | 2/1973 | Iwata | 315/151 |
| 4,302,084 | A | * | 11/1981 | Greenwald et al. | 396/106 |
| 5,278,397 | A | * | 1/1994 | Barkan et al. | 235/462.49 |
| 5,744,790 | A | * | 4/1998 | Li | 235/462.24 |
| 5,804,805 | A | * | 9/1998 | Koenck et al. | 235/462.01 |
| 6,184,534 | B1 | * | 2/2001 | Stephany et al. | 250/459.1 |
| 6,923,374 | B2 | * | 8/2005 | Knowles et al. | 235/454 |
| 2002/0134835 | A1 | * | 9/2002 | Kennedy | 235/384 |
| 2002/0148901 | A1 | * | 10/2002 | Barkan et al. | 235/462.43 |
| 2005/0103851 | A1 | * | 5/2005 | Zhu et al. | 235/462.11 |
| 2005/0116041 | A1 | * | 6/2005 | Zhu et al. | 235/462.42 |

* cited by examiner

*Primary Examiner*—Jared J. Fureman
*Assistant Examiner*—Tae W. Kim
(74) *Attorney, Agent, or Firm*—Kirschstein, et al.

(57) ABSTRACT

A target is illuminated with high intensity light pulses to make the target appear stationary to a solid state imager of an imaging reader to improve reader performance at high swipe speeds of the target.

12 Claims, 5 Drawing Sheets

PULSED ILLUMINATION IN IMAGING READER

BACKGROUND OF THE INVENTION

1. Field of the Invention

The present invention generally relates to an electro-optical reader for reading indicia, especially two-dimensional indicia, by image capture and, more particularly, for improving reader performance, especially when rapid relative motion is performed between the indicia and the reader.

2. Description of the Related Art

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are typically slid or swiped across the horizontal window through which a multitude of scan lines is projected in a generally upwards direction. When at least one of the scan lines sweeps over a symbol associated with a product, the symbol is processed and read.

The multitude of scan lines is generated by scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

Instead of, or in addition to, a horizontal slot scanner, it is known to provide a vertical slot scanner which is typically a portable reader placed on the countertop such that its window is generally vertical and faces an operator at the workstation. The generally vertical window is oriented perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

Each product must be oriented by the operator with the symbol facing away from the operator and directly towards either window. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located low or high, or right to left, on the product, or anywhere in between. The symbol may be oriented in a "picket fence" orientation in which the elongated parallel bars of the one-dimensional UPC symbol are vertical, or in a "ladder" orientation in which the symbol bars are horizontal, or at any orientation angle in between.

These point-of-transaction workstations have been long used for processing transactions involving products associated with one-dimensional symbols each having a row of bars and spaces spaced apart along one direction, and recently used for processing two-dimensional symbols, such as Code 49, as well. Code 49 introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786. Such two-dimensional symbols are generally read by electro-optical readers operative for projecting a laser beam as a raster of scan lines, each line extending in one direction over a respective row, and all the lines being spaced apart along a height of the two-dimensional symbol in a generally perpendicular direction.

Both one- and two-dimensional symbols can also be read by employing solid-state imagers. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view. In addition to the aforementioned symbols, scanners employing image sensor devices can also read general two-dimensional symbols, such as DataMatrix, which cannot be read by existing laser-based scanners.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

Thus, the known point-of-transaction workstations can generate raster scans capable of reading two-dimensional symbols, and can utilize solid-state imagers for capturing images of two-dimensional targets, especially two-dimensional symbols required to be electro-optically read. To acquire a target image, a solid-state imager, for example as embodied in a consumer digital camera, must be held in a stationary position for a time on the order of ten milliseconds relative to the target. Only when a solid-state imager is held in a fixed position relative to a target symbol can an image of the symbol be reliably captured and decoded, with the data encoded in the symbol being sent to a host for processing. In the context of a point-of-transaction workstation where the operator swipes the symbol at various swipe speeds past the window, sometimes once, sometimes several times, and where the operator presents the symbol with an additional component of movement toward and away from a window, and in some cases where the symbols are transported at various speeds on a moving conveyor past a window, and in still other cases where a handheld reader having a window is moved at various speeds relative to the symbol, the image of the symbol is blurred due to the relative motion between the symbol and the imager and, as a result, the image cannot be reliably and successfully decoded and read.

By way of numerical example, commonly available imagers operate at a video or frame rate of about 30 frames per second. Thus, the time to read an image out of the imager is about 33 milliseconds. At a swipe speed of 50 inches per second, a symbol travels approximately 1.5 inches in 30 milliseconds. The field of view at the near end of a working range of the reader could be about 2 inches or less in width. Therefore, at swipe speeds greater than 50 inches per second, the symbol can enter and exit the field of view in a time period less than 33 milliseconds, thereby making it impossible to successfully read the symbol. In effect, the symbol may be moved through the field of view so quickly that a conventional imager does not have sufficient time to obtain even one complete image of the symbol.

SUMMARY OF THE INVENTION

OBJECTS OF THE INVENTION

Accordingly, it is a general object of this invention is to advance the state of the art of electro-optical readers that operate by image capture.

Another object of this invention is to reliably capture two-dimensional target images of a symbol moving at swipe speeds greater than can be read by commonly available imagers.

Still another object of the present invention is to capture images of fast-moving targets at workstations or at handheld readers to enhance reader performance.

FEATURES OF THE INVENTION

In keeping with the above objects and others which will become apparent hereinafter, one feature of the present invention resides, briefly stated, in a reader for electro-optically reading indicia, especially two-dimensional symbols. The reader could be embodied as a stationary point-of-transaction workstation having a window, or as a handheld reader having a window. During reading, relative motion is conducted between the symbol and the window. For example, in the case of the workstation, the symbol is swiped past the window and, in the case of the handheld reader, the reader itself is moved relative to the symbol. In the preferred embodiment, the workstation is installed in a retail establishment, such as a supermarket.

In accordance with this invention, a two-dimensional, solid-state imager is mounted in the reader, and includes an array of image sensors operative for capturing light from a two-dimensional target through the window over a field of view during the reading. Preferably, the array is a CCD or a CMOS array. The imager is associated with a high-speed strobe illuminator to enable the image of the target to be acquired in a very short period of time, for example, on the order of 500 microseconds, so that the target image is not blurred even if there is relative motion between the imager and the target. The strobe illumination is brighter than ambient illumination, especially close to the window, and assists autodiscrimination as described herein.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
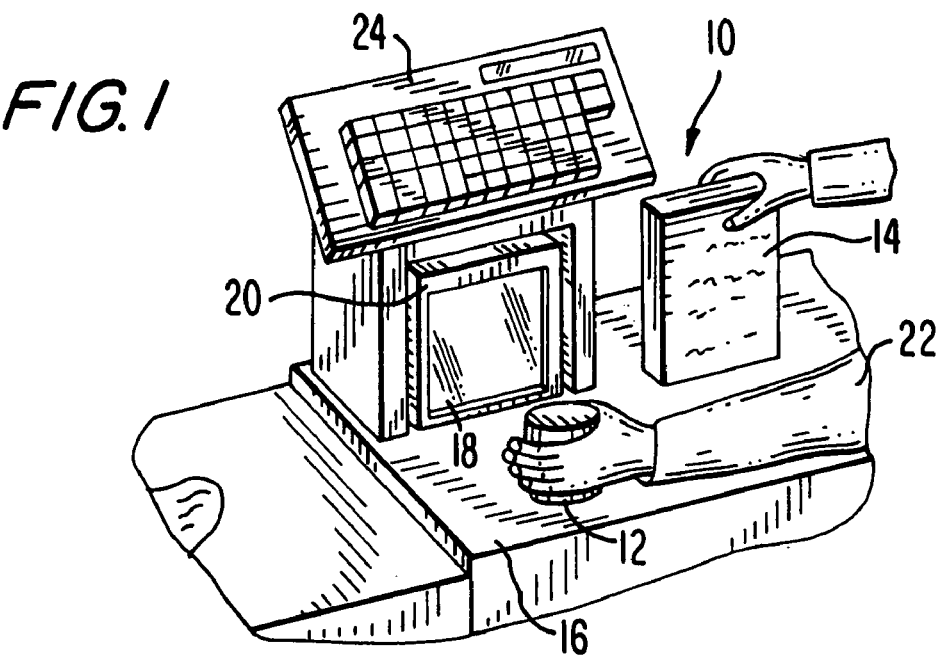
FIG. 1 is a perspective view of a point-of-transaction workstation operative for capturing light from two-dimensional targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a vertical window 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
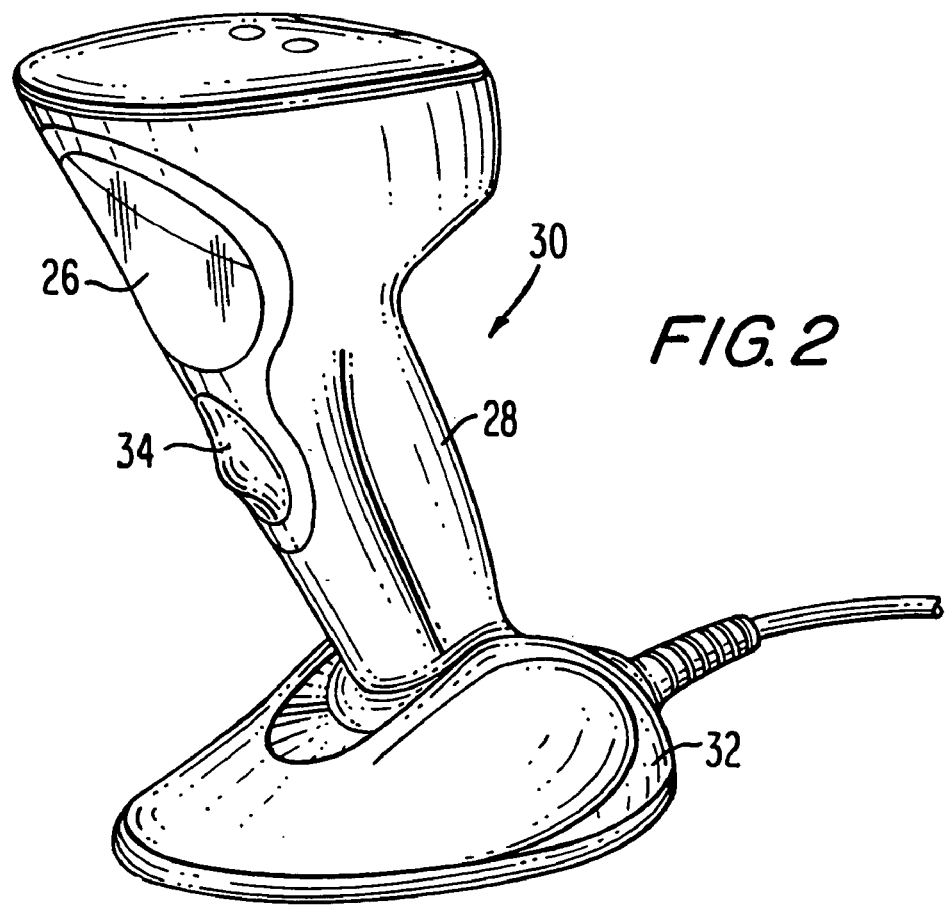
FIG. 2 is a perspective view of an electro-optical reader operative in either a hand-held mode, or a workstation mode, for capturing light from two-dimensional targets in accordance with this invention.

Reference numeral 30 in FIG. 2 generally identifies another reader having a different configuration from that of reader 20. Reader 30 also has a generally vertical window 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

As described so far, the readers 20, 30 are conventional. In accordance with this invention, an imager 40 and a focusing lens 41 are mounted in an enclosure 43 in either reader, such as the reader 20 of FIG. 3. The imager 40 is a solid-state device, for example, a CCD or a CMOS imager and has an array of addressable image sensors operative for capturing light through the window 18 from a target, for example, a two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator 42 is also mounted in the reader and preferably includes a plurality of light sources, e.g., light emitting diodes (LEDs) 42a through 42l, arranged around the imager 40 to uniformly illuminate the target, as shown in FIG. 4.

Figure 3:
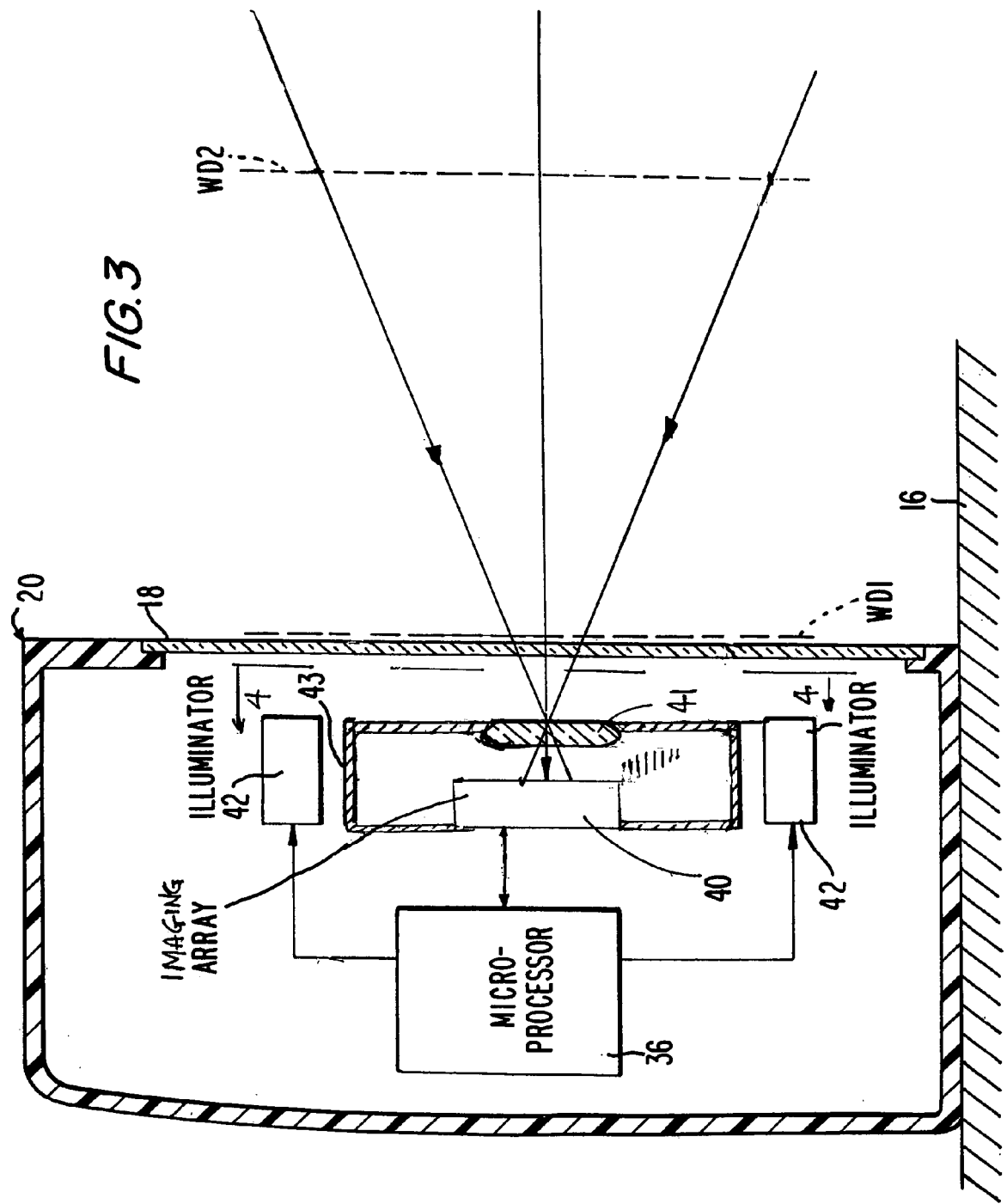
FIG. 3 is a block circuit diagram of various components of the workstation of FIG. 1.
Figure 4:
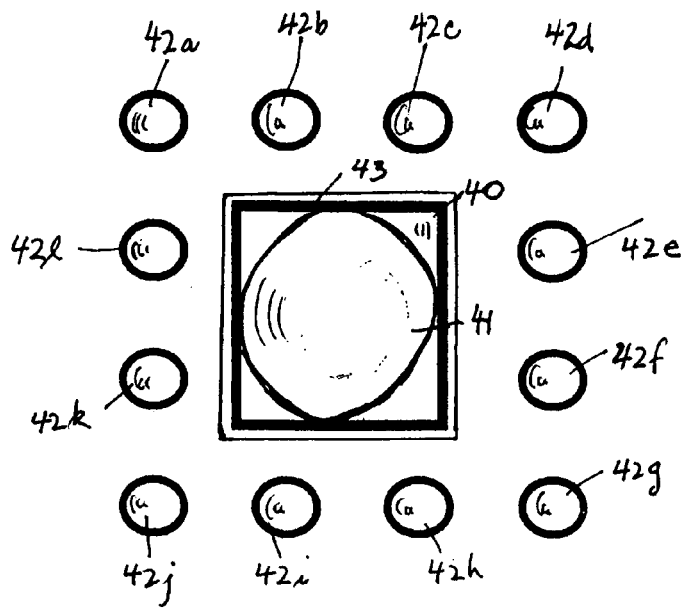
FIG. 4 is an elevational view taken on line 4—4 of FIG. 3.

As shown in FIG. 3, the area imager 40 and the illuminator 42 are operatively connected to a controller or microprocessor 36 operative for controlling the operation of these components. Preferably, the microprocessor is the same as the one used for decoding light scattered from the indicia and for processing the captured target images.

In operation, the microprocessor 36 sends a command signal to the illuminator 42 to pulse the LEDs for a short time period of 500 microseconds or less, and energizes the area imager 40 to collect light from a target substantially only during said time period. A typical array needs about 33 milliseconds to read the entire target image and operates at a frame rate of about 30 frames per second. The array may have on the order of one million addressable image sensors.

In the presence of relative motion between the imager and the target, especially at high swipe speeds of 50 inches per second or greater, the target may enter and exit the field of view in such a short period of time that only one full image of the target can be captured. Hence, this invention proposes that the intensity of the light pulses by the illuminator to be dramatically increased. First, the number of LEDs is increased to be above about ten, and twelve LEDs are depicted in FIG. 4. Second, each LED is overdriven above its rated current. For example, if the rated current of each LED is 40–50 milliamps, then this invention proposes overdriving each LED with a drive current on the order of 150 milliamps. To compensate for overdriving the LEDs, a very low duty cycle on the order of 5% or less is used to allow heat in the LEDs to dissipate. The resulting high intensity light pulses produce a strobe effect to make the target appear stationary to the imager 40 and, thus, the motion of the target appears frozen in time to the imager which is then able to capture the entire image of the target.

High speed motion tracking of the target is further enhanced by increasing the frame rate to above the television standard of 30 frames per second. The microprocessor causes the illuminator to flash at a rate of at least 50–60 flashes per second. At a pulse time of 500 microseconds, a flash rate of 100 flashes per second can be supported and still stay within the 5% duty cycle. This increased flash rate also reduces illumination flicker which can be quite annoying to customers and operators at the transaction station.

The imager 40 itself should have a global electronic shutter in which all the sensors are simultaneously exposed for light capture. Most CCD arrays are designed with a global electronic shutter. A typical CMOS array is designed with a rolling electronic shutter in which different sensors are exposed at different times. If a CMOS array is used, then it must be designed to allow a global electronic shutter.

High intensity LEDs require high current drivers, and the illuminator described above can be expected to draw 1 to 2 amps when on. As shown in the driver circuit of FIG. 5, a large capacitor C on the order of 2000 microfarads is trickle charged and acts as the current source for representative LED 42a. Assuming a 2% duty cycle, about 60 flashes per second, and a pulse time of 300 microseconds, the continuous trickle current $I_C$ required to replenish the charge on the capacitor is about 20–40 milliamps.

Figure 5:
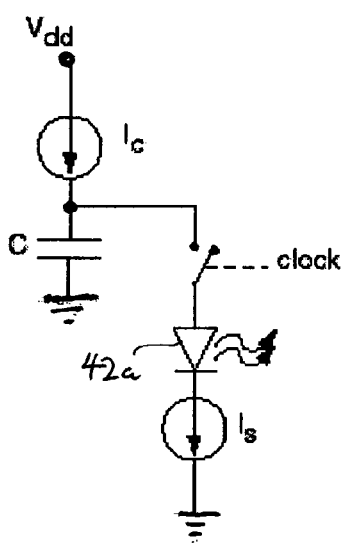
FIG. 5 is a general schematic of a drive current circuit.
Figure 6:
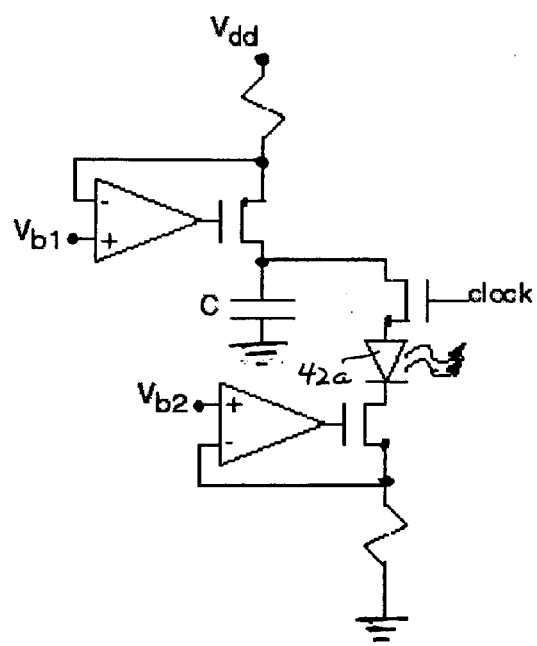
FIG. 6 is a practical implementation of the circuit of FIG. 5.

As shown in FIG. 5, the trickle current $I_C$ is proportional to the switched current $I_S$ by the duty cycle of the clock signal. If the duty cycle is 2%, and the switched current is 2 amps, then the trickle current is 40 milliamps. FIG. 6 depicts a practical implementation of the FIG. 5 circuit. The current sources are linear for a range of voltages on the capacitor. For a 2000 microfarad capacitor, the voltage swing on the capacitor is about 0.3 volts. It takes about 165 milliseconds for the capacitor to reach its initial voltage of 3.3 volts. The components in FIG. 6 are chosen dependent on the number of LEDs that are driven and the available continuous drive current.

Figure 7:
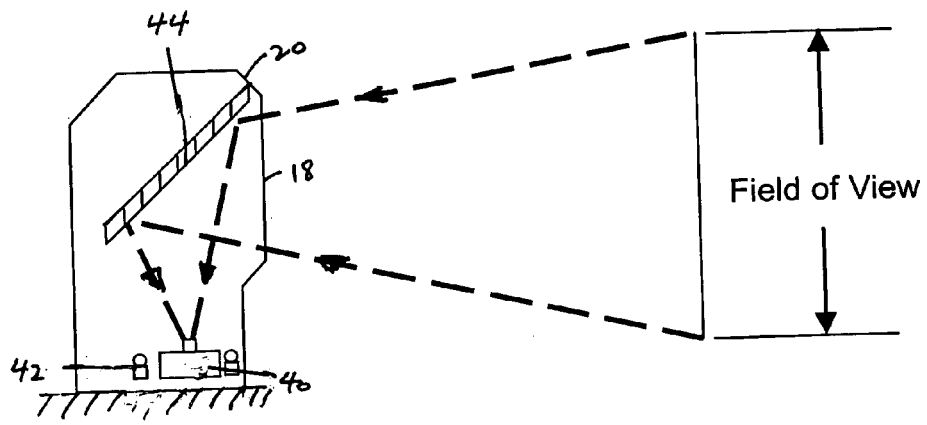
FIG. 7 is a diagrammatic view of another embodiment of a workstation in accordance with this invention.

FIG. 7 is a schematic diagram of the housing 20 in which the imager 40 and the illuminator 42 are not positioned in close proximity to the window 18, but are positioned further within the housing well away from the window 18. A folding mirror 44 enables the imager and the illuminator to be located adjacent a bottom wall of the housing so that the light captured over the field of view is reflected by the mirror before being captured by the imager.

The plurality of LEDs which comprise the illuminator together act as a pseudo-point source illuminator due to their remote placement from the window. The field of view expands so that it covers a normal sized symbol at the window. In the preferred embodiment, the intensity of the LEDs is chosen so that a symbol at the window is not saturated. At further working distances from the window, the image of the symbol will appear darker. However, over the complete working range, the variation of the light intensity will not preclude a successful decode.

A pseudo-point source illuminator is efficient in covering a fixed field-of-view (FOV) especially where the FOV of the illuminator and of the imager are coincident, as shown in FIG. 7. However, the intensity of the light produced by a point source is inversely proportional to the square of the distance from the source. In the pseudo-point source illuminator of FIG. 7, the images tend to be overexposed close to the window 18 and dim far from the window. Hence, another embodiment of this invention proposes setting the exposure time of the imager to a fixed, constant value, for example, 500 microseconds, and then adjusting the flash time period of the illuminator. Specifically, the flash time period is reduced if an overexposed image is expected.

Figure 8:
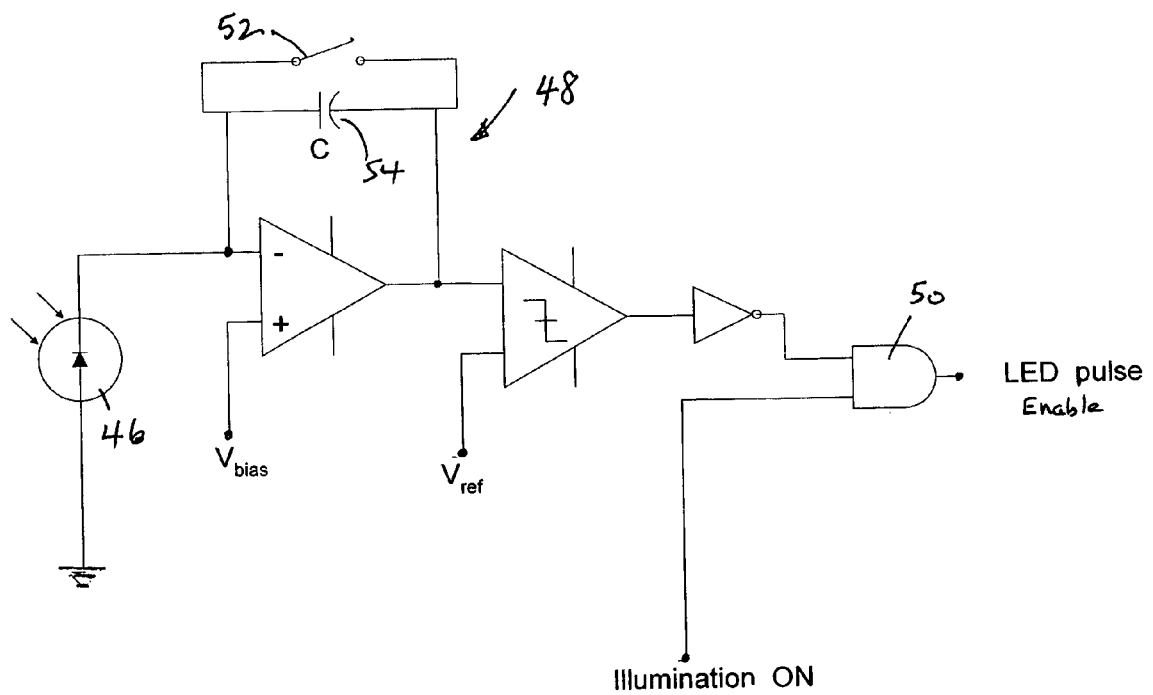
FIG. 8 is an electrical schematic of an exposure control circuit for use in one of the workstations of this invention.

FIG. 8 depicts a real-time control circuit for adjusting the flash time period of the light pulses. A photodiode 46 having an FOV commensurate with the imager is connected to an integrator 48 to measure the amount of light captured by the imager. The microprocessor 36 sends an "Illumination-ON" signal to a drive amplifier 50. Integration starts when the Illumination-ON signal goes high by opening the switch 52 connected in parallel with an integration capacitor 54. If the total accumulated light exceeds a predetermined value $V_{ref}$, then the LEDs are switched off before the Illumination-ON signal terminates. This circuit prevents image saturation, but does not increase integration time if the image is dark (underexposed). The intensity of the LEDs is selected to minimize the possibility of an underexposed image. When the integrator indicates that there is an adequate level of accumulated light, then the LEDs are switched off. Modulating the LED flash time period works well because the high intensity light swamps the ambient light, and any light accumulated after the LEDs are switched off is negligible.

Figure 9:
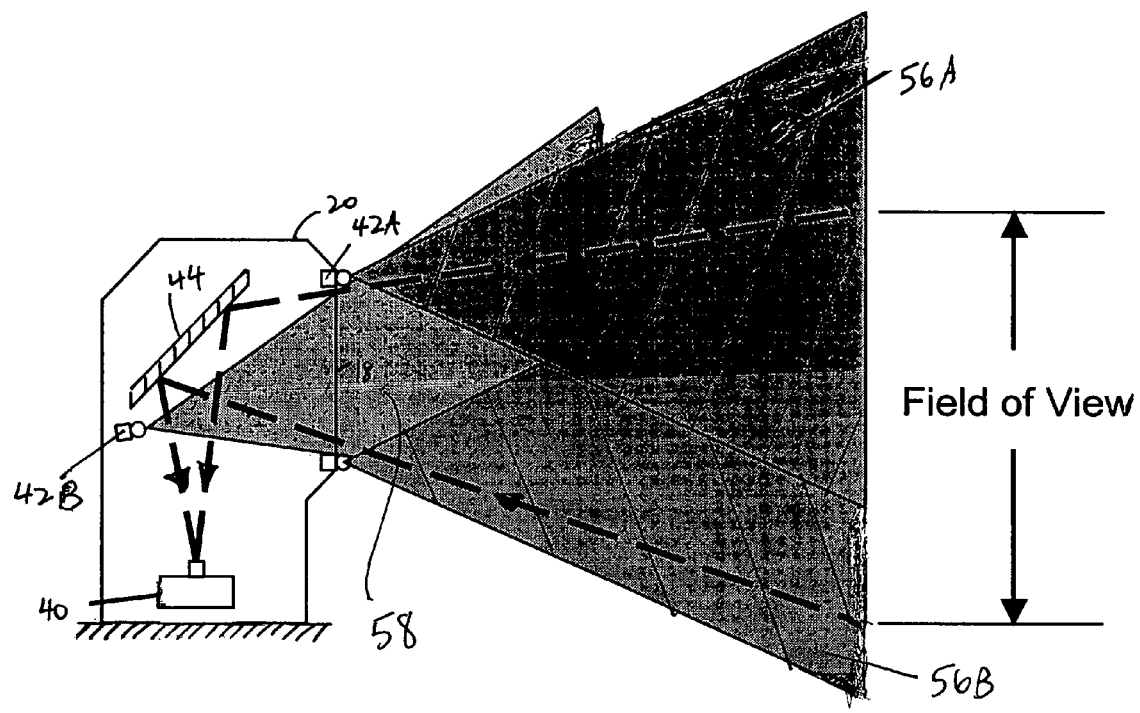
FIG. 9 is a diagrammatic view of still another embodiment of a workstation in accordance with this invention.
Figure 10:
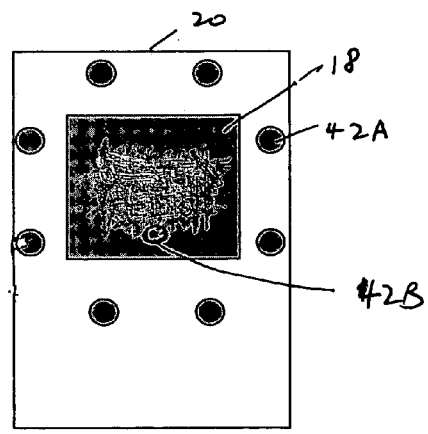
FIG. 10 is a front elevational view of the workstation of FIG. 9.

FIG. 9 depicts another fixed exposure embodiment analogous to the embodiment of FIG. 7, except that the illuminator 42 comprises two illumination subsystems 42A, B. The first subsystem 42A is comprised of a plurality of LEDs exteriorly arranged on the housing around the window 18, as shown in FIG. 10. Each exterior LED projects light over a conical volume shown by hatched areas 56A, B. The second subsystem 42B is comprised of one or more LEDs positioned within the housing remote from the window 18, and operative to project light over a conical volume shown by stippled area 58. Thus, the working distance range is divided into a near range 58 and a far range 56A, B.

The split illumination provided by the exterior and interior LEDs makes the illumination more uniform over the entire working range. Thus, by interiorly locating the interior LEDs, their light intensity is lower at the window where an overexposed image is normally expected. By exteriorly locating the exterior LEDs, their light intensity is greater in the far range where a dark image is normally expected.

In applications where the high intensity light, for example, from the exterior LEDs may be disconcerting to a customer or personnel at the transaction station, one or more of the LEDs can emit light of a different wavelength such that its light is not readily seen, for example, infrared light. Other techniques to make the bright light less annoying could include illuminating LEDs at other locations to distract one's attention.

Maximum efficiency is achieved by synchronizing the high intensity light pulses with the exposure time of the imager. Preferably, the exposure time is fixed as described above so that the reader need not make any exposure decision which would otherwise delay the capture of the moving target. Of course, the exposure time could also be adjusted, if it could be performed within a single frame, or at moments between image captures. For example, the photodiode 46 in FIG. 8 can be used to sense return light reflected from the target to determine how to set the next exposure time.

To save power during periods of inactivity, the imager 40 or the photodetector 46 can be used to periodically monitor the FOV using ambient light, thereby requiring relatively long integration times of many milliseconds. If a significant change in the FOV is detected between monitoring points, for example, several seconds apart, then one or more of the LEDs can be pulsed to produce high intensity light pulses for determining if a target is within the FOV and the working range. If so, the reader is activated from its sleep mode to an active mode.

It will be understood that each of the elements described above, or two or more together, also may find a useful application in other types of constructions differing from the types described above. Thus, readers having different configurations can be used.

While the invention has been illustrated and described as a pulsed illuminator in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A reader for electro-optically reading indicia, comprising:
    a) a housing having a window past which relative motion between the window and the indicia is conducted during reading, the housing having a front wall for supporting the window, a rear wall spaced away from the front wall, and a base connected to the front and rear walls and operative for supporting the housing;
    b) a solid-state imager in the housing and including an array of image sensors for capturing light through the window from the indicia over a field of view during the reading; and
    c) a pulsed illuminator for illuminating the indicia with pulses of light of high intensity to make the indicia appear stationary to the imager during the reading, the illuminator including a first illumination subsystem exteriorly arranged on the front wall around the window, for illuminating indicia located in a far range of working distances remote from the window with a first light intensity during the reading, and a second illumination subsystem interiorly positioned within the housing adjacent the rear wall, for illuminating indicia located in a near range of working distances adjacent the window with a second light intensity less than the first light intensity during the reading, thereby uniformly illuminating the indicia over the near and far ranges.

2. The reader of claim 1, and a controller for controlling the illuminator to generate the light pulses with a time duration less than five hundred microseconds, and with an intensity level at least five times greater than that of ambient light.

3. The reader of claim 1, wherein the illuminator includes a plurality of light emitting diodes (LEDs).

4. The reader of claim 3, wherein each LED has a rated drive current, and wherein the illuminator overdrives each LED with a drive current in excess of the rated drive current, but at a reduced duty cycle of less than five percent.

5. The reader of claim 1, and a controller for controlling the illuminator to generate the light pulses at a rate in excess of thirty pulses per second to reduce illumination flicker.

6. The reader of claim 1, and a trickle charger for continuously charging a capacitor at a low rate to maintain a constant voltage on the capacitor, the capacitor being used as an energy source for the illuminator.

7. The reader of claim 1, wherein the illuminator includes a plurality of light emitting diodes (LEDs) for emitting light of different wavelengths.

8. The reader of claim 1, wherein the imager is positioned within the housing adjacent the base and captures light from the indicia located in proximity to the window.

9. The reader of claim 1, wherein the imager has a field of view, and wherein the illuminator has a field of view commensurate with that of the imager.

10. The reader of claim 1, wherein the imager is one of a charge coupled device and a complementary metal oxide silicon device having a global electronic shutter.

11. The reader of claim 1, wherein the imager has a fixed exposure time; and a controller for controlling the illuminator to generate the light pulses with a time duration, and a detector for detecting return light returned from the indicia; and wherein the controller is operative for adjusting the time duration as a function of the return light detected by the detector.

12. The reader of claim 1, wherein the reader has a sleep mode in which the illuminator is inactive, and wherein the imager periodically captures light over the field of view in the sleep mode; and a controller for determining if an indicium is present in the field of view and for activating the illuminator to emit the light pulses in an active mode for the reader.

* * * * *